United States Patent

[11] 3,570,749

[72] Inventors Wasuke Sato
Kawasaki-shi;
Fumio Iriko, Tokyo; Sadao Yamamoto,
Kawasaki-shi; Mitsumaro Fujisawa;
Shigeyuki Hatakeyama, Yokohama-shi,
Japan
[21] Appl. No. 847,647
[22] Filed Aug. 5, 1969
[45] Patented Mar. 16, 1971
[73] Assignee Showa Denko K. K.
Tokyo, Japan
[32] Priority Aug. 9, 1968, Dec. 20, 1968, April 11, 1969,
[33] Japan
[31] 43/56113, 43/110790, 43/110791, 44/32513,
44/32514, 44/32515

[54] HEAVY DUTY BAGS
19 Claims, 33 Drawing Figs.
[52] U.S. Cl..................................................... 229/55,
150/1, 150/1.7
[51] Int. Cl..................................................... B65d 33/02
[50] Field of Search........................................ 229/53, 55;
150/1, 1.7, 12; 93/35; 294/86 (G)

[56] References Cited
UNITED STATES PATENTS
2,493,085  1/1950  Pincus........................ 150/1.7
2,934,122  4/1960  Lindsey....................... 150/1

Primary Examiner—David M. Bockenek
Attorney—Flynn and Frishauf

ABSTRACT: Heavy duty bags wherein stretched tapes made of synthetic resin such as high density polyethylene or polypropylene are spirally wound in opposite directions in a manner to intersect each other to form a plurality of superposed cylindrical bodies. The superposed portions of the intersecting stretched tapes forming said cylindrical bodies are bonded together to form a cylindrical network, one end of which is sealed to provide a bottom.

HEAVY DUTY BAGS

The present invention relates to heavy duty bags used in storing or transporting cereals, fertilizers or other granular or powdered product of relatively great weight.

Since stretched tapes made of high density polyethylene or polypropylene display extremely high tensile strength, they are employed in various applications such as fabric prepared by weaving said tapes as a warp and woof (normally, plain fabric) or composite articles formed by laminating synthetic film with said fabric. Particularly in recent years, fabric woven from the aforesaid stretched tapes is widely used as the material of such heavy duty bags instead of the heretofore used hemp. Use of the stretched tapes has permitted the manufacture of bags which can fully withstand heavy loads resulting from piling up or falling impacts.

However, the operation of weaving fabric from the aforementioned stretched tapes has heretofore presented difficulties in increasing efficiency. This in turn has obstructed reduction in the manufacturing cost of stretched tape cloth and in consequence formed a bottleneck to the production of inexpensive heavy duty bags.

The object of the present invention is to eliminate the drawbacks encountered with the prior art and provide a novel type of heavy duty bags which can be prepared from synthetic resin stretched tapes with high efficiency without weaving.

SUMMARY OF THE INVENTION

The heavy duty bag according to the present invention is prepared by spirally winding stretched tapes of synthetic resin in opposite directions in a manner to intersect each other to form a plurality of superposed cylindrical bodies, bonding together the superposed portions of the intersecting tapes constituting the cylindrical body (the term "bonding" as used in this specification denotes not only bonding by means of an adhesive agent but also by thermal fusion) to form a cylindrical network, or bonding synthetic resin film to one or both sides of said network to form a cylindrical composite body and sealing one end of the cylindrical network or composite body to provide a bottom.

Among the stretched tapes made of synthetic resin, the one of high density polyethylene or polypropylene is particularly preferable due to its extremely high tensile strength. The film used in preparing the aforesaid network-film composite body consists of polyethylene, polypropylene, polyvinyl chloride or other types of synthetic resin. These raw materials may be selectively used according to the application in which the subject heavy duty bag is employed.

The spirally wound inner and outer stretched tapes of the superposed cylindrical bodies may intersect each other at suitable angles depending on the application intended. However, it is preferred that a heavy duty bag according to the present invention have substantially equal longitudinal and transverse strength. To this end, it is advisable to allow the tapes to intersect each other at an angle of about 90°. Also, the width and number of the stretched tapes and the space at which they are wound may be selectively defined according to the application in which the bag is used. Referring to, for example, the intertape space, where the bag is desired to hold fine powders or be airtight, the tapes are spirally wound in such a manner as to allow their edges to be closely attached to or slightly overlap each other. Again where the bag is demanded to have breatheability, the tapes are wound so as to allow for a suitable space therebetween.

The present invention enables a heavy duty bag to be manufactured in high efficiency by the later described simple process. Accordingly, the invention drastically cuts the cost of such a bag as compared with the one obtained by the prior art involving weaving (and lamination). Moreover, the bag according to the invention has a remarkable great mechanical strength. Further, the present heavy duty bag is prepared simply by sealing one end of a cylindrical network or network-film composite body to form a bottom so that there is no need to seal the bag edges as is the case with the prior art which prepared a bag from flat sheeting. In this respect, too, the present invention has the advantage of simplifying the process of manufacturing bags.

The present invention can be more fully understood from the following detailed description when taken in connection with reference to the accompanying drawings, in which.

Figure 5:
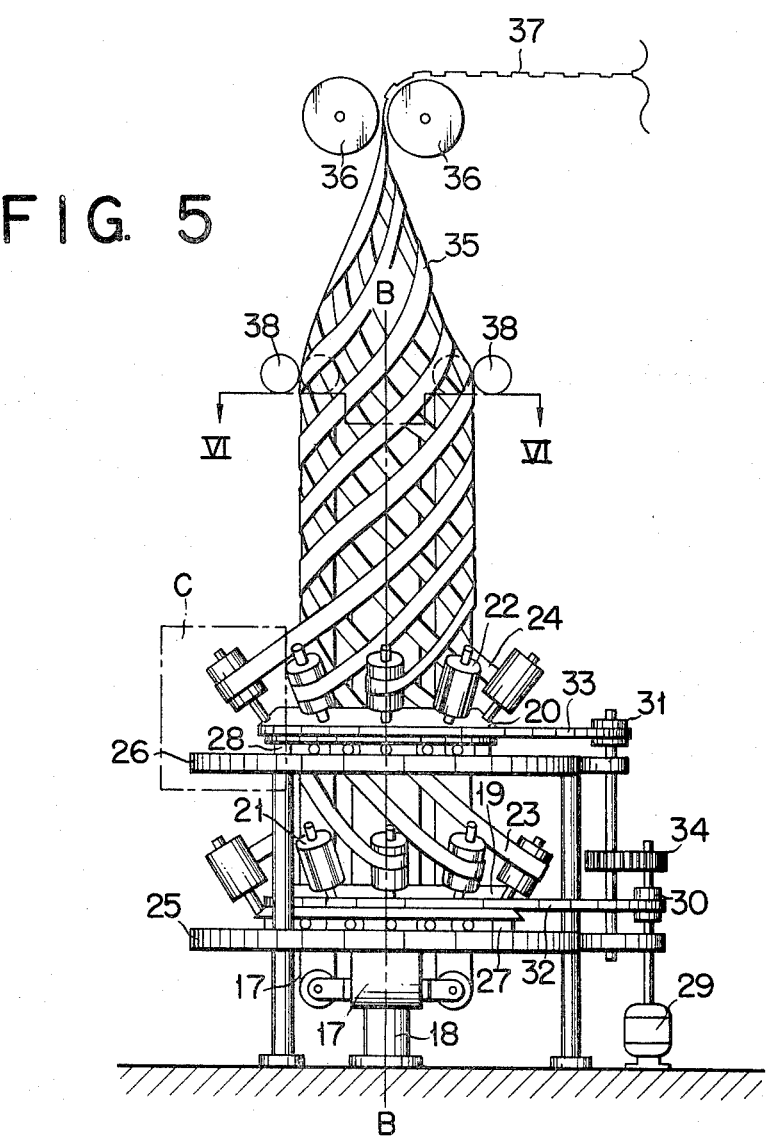
FIG. 5 is an elevation of another apparatus used in the invention.
Figure 13:
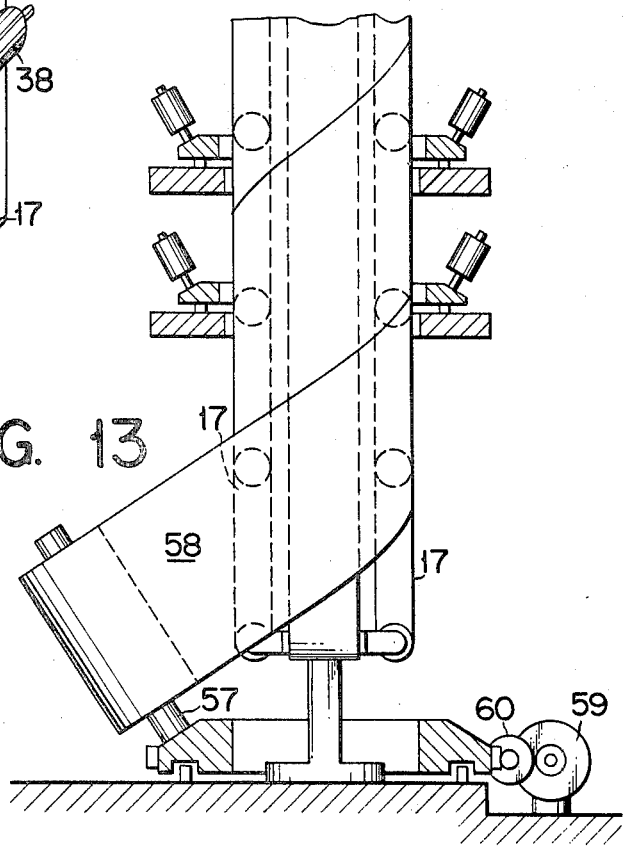
Figure 14:
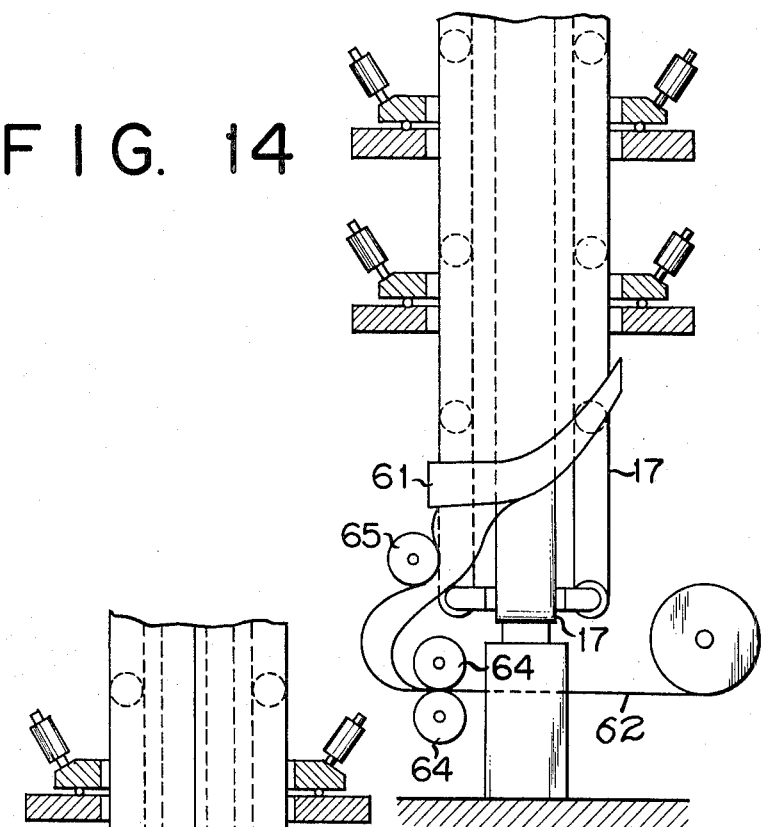
Figure 15:
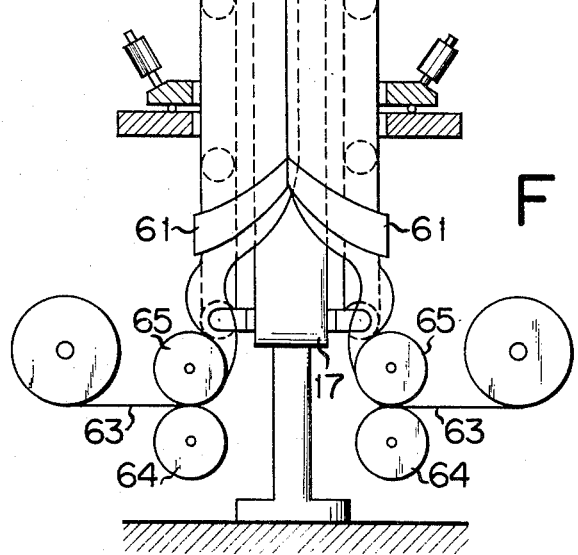
Figure 16:
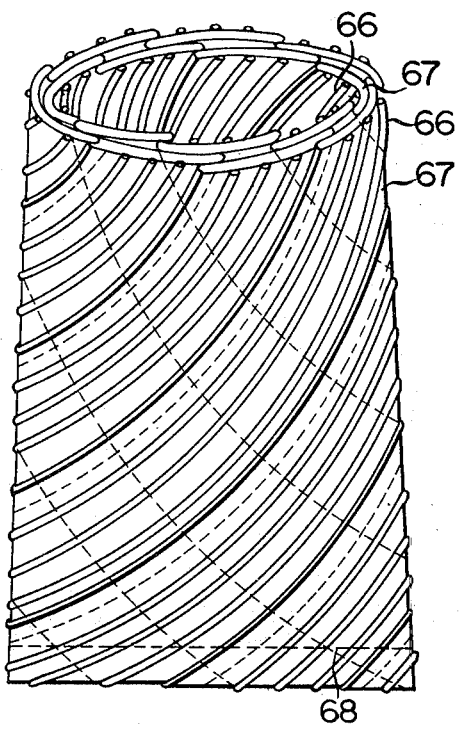
Figure 17:
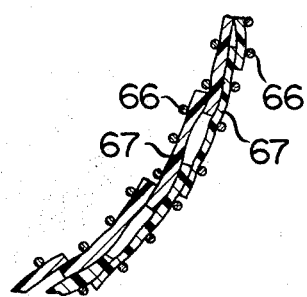
Figure 18:
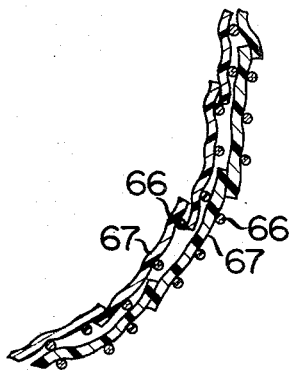
Figure 19:
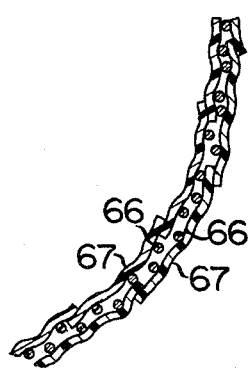
Figure 20:
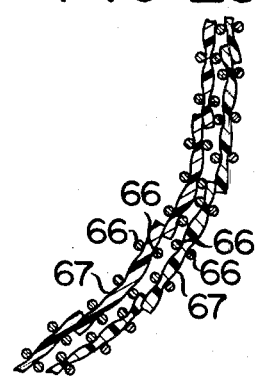
Figure 21:
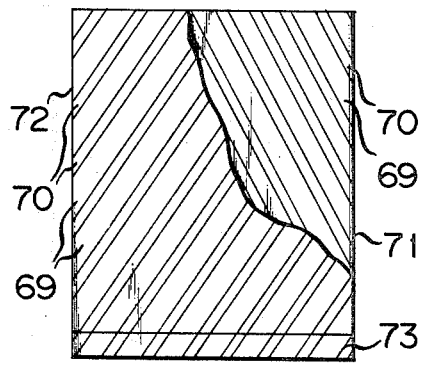
Figure 22:
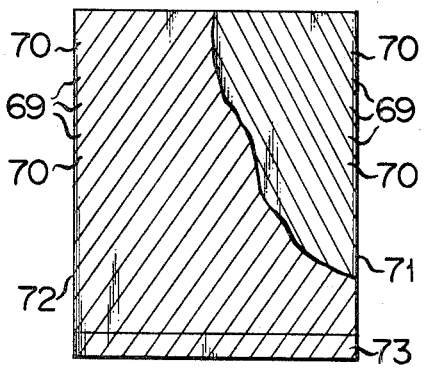
Figure 23:
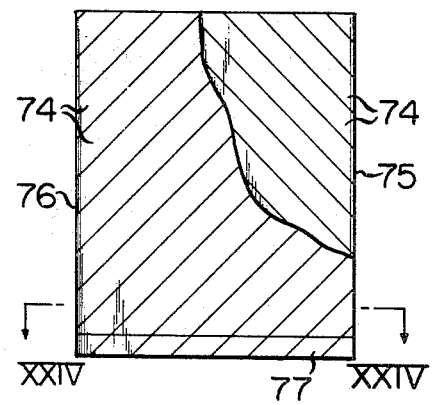
Figure 25:
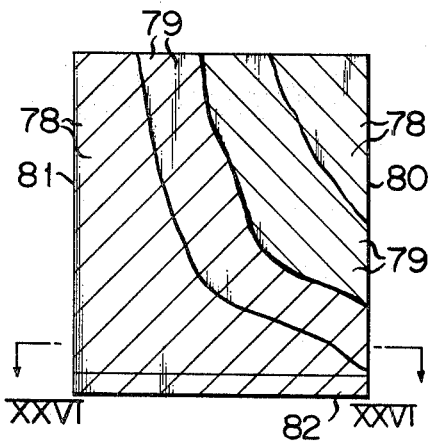
Figure 24:
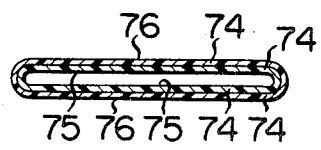
Figure 26:
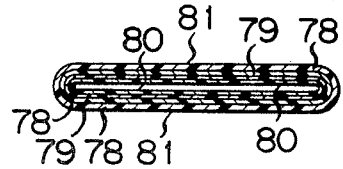
Figure 27:
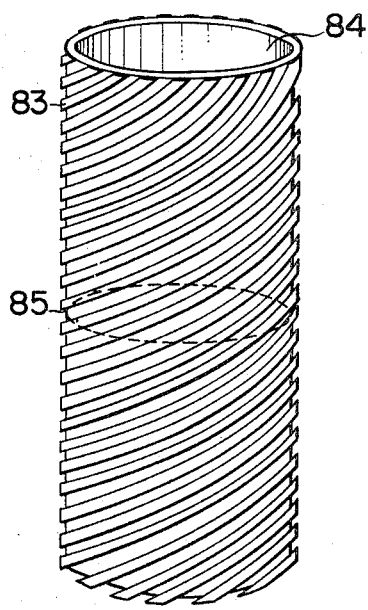
Figure 28:
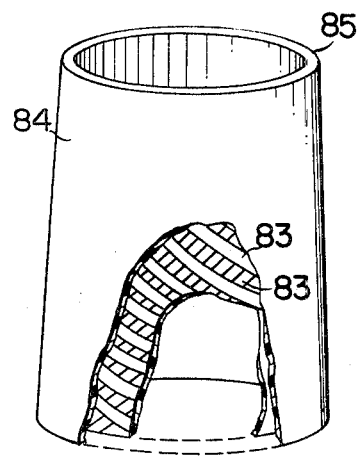
Figure 29:
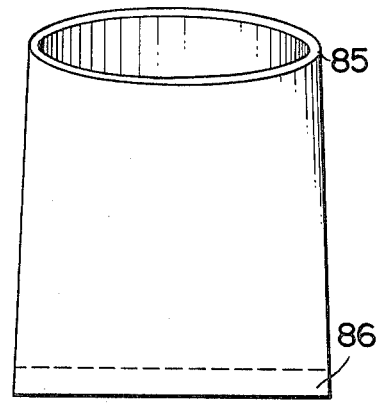
Figure 30A:
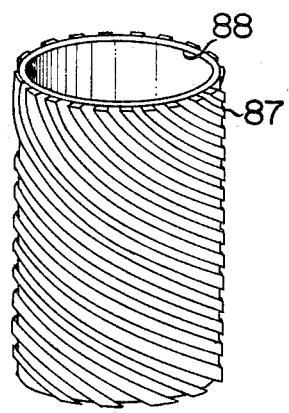
Figure 31:
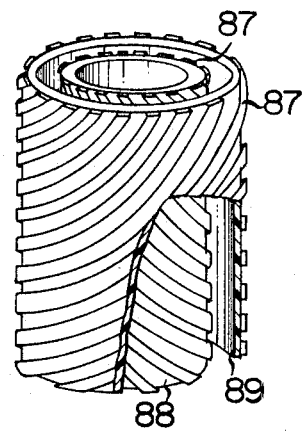
Figure 30B:
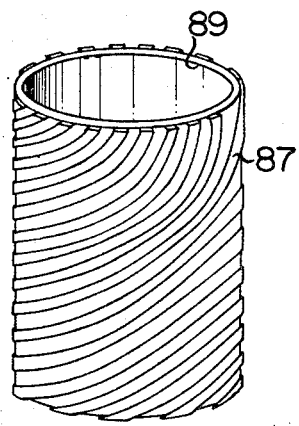
Figure 32:
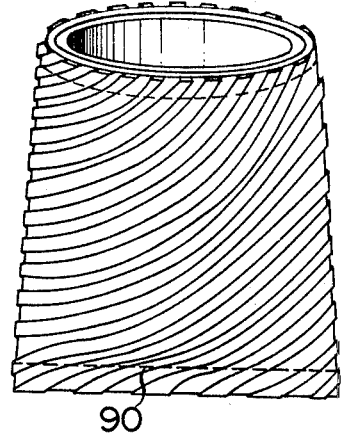

FIGS. 13 to 15 mainly illustrate a film applying mechanism attached to the apparatus of FIG. 5;

FIG. 16 is a perspective view of another type of heavy duty bag according to the invention;

FIG. 17 is an enlarged cross section of the material of the heavy duty bag of FIG. 16;

FIGS. 18 to 20 are enlarged cross sections of the bag materials used in another type of heavy duty bag according to the invention;

FIGS. 21 and 22 are elevations, with part broken away, of still another type of heavy duty bag according to the invention;

FIG. 23 is an elevation, with part broken away, of still another type of heavy duty bag according to the invention;

FIG. 24 is a cross section on line XXIV–XXIV of FIG. 23;

FIG. 25 is an elevation, with part broken away, of a further type of heavy duty bag of the invention;

FIG. 26 is a cross section on line XXVI–XXVI of FIG. 25;

FIG. 27 is a perspective view of a modification of the material of a heavy duty bag prepared from a cylindrical network-film composite body;

FIG. 28 is a perspective view, with part broken away, of the bag material of FIG. 27, whose lower half is turned over so as to be superposed on the upper half;

FIG. 29 is a perspective view of a heavy duty bag prepared by sealing one end of the bag material of FIG. 28;

FIGS. 30A and 30B jointly present a perspective view of another modification of the material of a heavy duty bag prepared from a cylindrical network-film composite body;

FIG. 31 is a perspective view, with part broken away, of the condition in which the inner and outer bag materials of FIGS. 30A and 30B are superposed; and FIG. 32 is a perspective view of a heavy duty bag prepared by sealing one end of the superposed assembly of the bag materials of FIG. 31.

There will now be described with reference to the appended drawings a heavy duty bag according to the present invention and a method for manufacturing the same.

Figure 1:
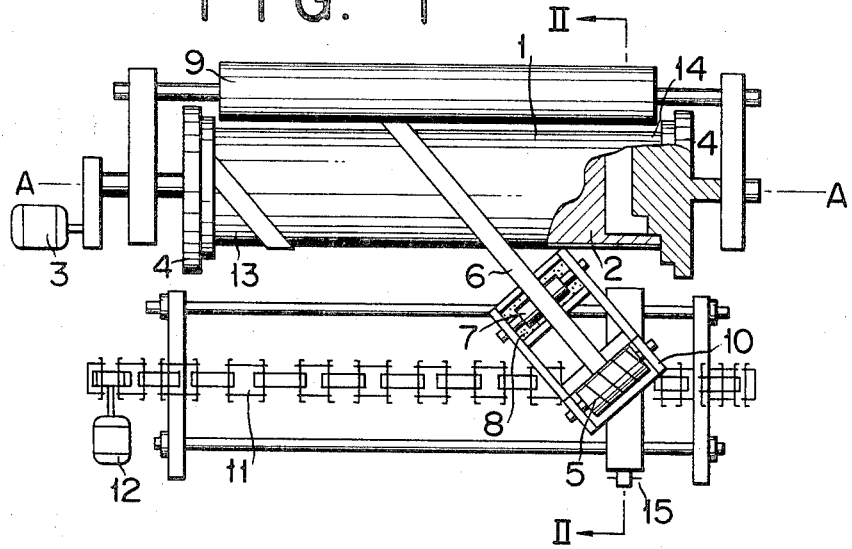
FIG. 1 is a plan view of a bag-manufacturing apparatus used in the present invention.
Figure 2:
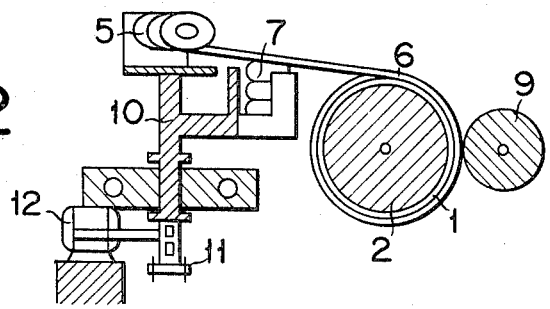
FIG. 2 is a cross section on line II–II of FIG. 1.
Figure 3:
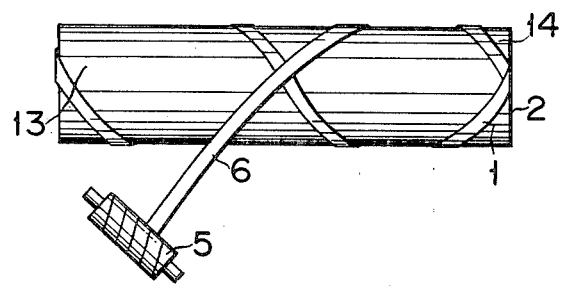
FIG. 3 is a schematic illustration of the manufacturing process of a heavy duty bag by the apparatus of FIG. 1.
Figure 4:
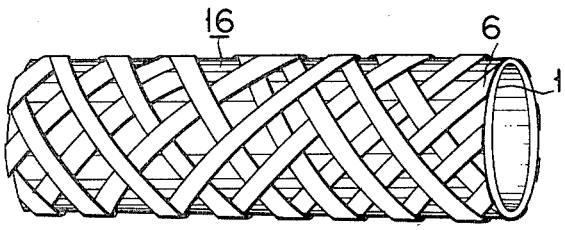
FIG. 4 is a perspective view of a heavy duty bag used in the present invention prepared by the apparatus of FIG. 1.

Referring to FIGS. 1 and 2, there is rotated a suitable cylindrical member 2 covered with cylindrical synthetic resin film 1 around the axis A–A using a drive mechanism 3. The cylindrical member 2 is supported by its support means 4 disposed on both sides thereof in such a manner as to be detachable from either of them. The stretched tape 6 taken up on a bobbin 5 is wound on the surface of the film 1 while an adhesive 8 is being applied on said tape 6 using a coating roll 7. The bonding of the tape 6 to the film is effected by a press roll 9. The supporting means 10 of the bobbin 5 is transferred by a chain device 11 moved by a drive mechanism 12 along the axis A–A of the cylindrical member 2 and interlockingly with its rotation, thereby causing the stretched tape to be spirally wound about the cylindrical member 2. When the spiral winding of the stretched tape 6 about the cylindrical member 2 starting with one end 13 of the cylindrical film 1 is finished at the other end 14 of said film 1, then there is actuated a limit switch 15 disposed under the support means 10 of the bobbin 5 to cause the drive mechanism 12 to rotate in the opposite direction. This reverse rotation is transmitted to the chain device 11 to allow the support means 10 of the bobbin 5 to be transferred in the opposite direction to the previous case, so that the stretched tape 6 is wound about the film 1 starting this time with the end 14 toward the end 13 in the reverse spiral form as illustrated in FIG. 3. If the aforementioned winding operation is repeated as often as required, then there is produced a network-film composite body 16 as shown in FIG. 4 because a network consisting of intersecting stretched tapes is bonded to the surface of the cylindrical synthetic film. When said composite body 16 is sealed at one end after being taken off of the cylindrical member 2, there is obtained a heavy duty bag formed of said composite body 16.

In addition to the aforementioned method, bonding may be made by another process which consists in previously coating that plane of the stretched tape 6 which requires bonding with commercially available dry lamination adhesive or hot melt adhesive and, after being dried, taking up said tape 6 on the bobbin 5, thereafter winding said coated tape 6 around the surface of the film 1 and bonding a network consisting of said stretched tape to the film 1 by heating the press roll 9 to 60° to 90° C. If there are provided a plurality of bobbins 5 for the stretched tape 6, the aforementioned bonding methods enable a plurality of stretched tapes 6 to be fed to the bag manufacturing machine at the same time. Further, bonding may be a process which involves the use of two bobbins combined with a drive mechanism and winds and bonds two tapes on to a cylindrical synthetic resin film 1, starting with both ends of said film 1 toward the respective opposite ends. It will be apparent that the aforesaid various bonding methods may be employed in suitable combination and also the process of previously coating the stretched tape with an adhesive may be incorporated in any or combination of the aforesaid bonding methods. Each of the foregoing bonding methods is useful in elevating the efficiency of manufacturing a heavy duty bag.

There has been described a heavy duty bag and a method for manufacturing a heavy duty bag from a composite body consisting of a cylindrical network and film. Also where the bag is only formed of a cylindrical network, there can be used substantially the same process as in the preceding case with some slight modifications, excepting that a cylindrical form of synthetic resin film is omitted. Namely, when the stretched tape is initially wound its leading end should be fixed on the cylindrical member 2 by suitable means, and the adhesive agent should preferably be applied only to those parts of intersecting stretched tapes which are superposed on each other. To this end, it will be advisable to adopt such arrangement as to allow, for example, the coating roll 7 of FIGS. 1 and 2 to intermittently contact the tape 6 and operate said roll 7 each time those respective lengths of the intersecting tapes 6 which are defined between the superposed parts are fed to the coating device.

The diameter of the cylindrical member 2 is determined according to the desired measurements of a heavy duty bag manufactured from a network or a network-film combination. For a practical bag manufacturing apparatus, therefore, it is convenient to provide a plurality of cylindrical members 2 and use them interchangeably.

The angle at which the stretched tape 6 is wound about the cylindrical member 2 or the cylindrical form of synthetic resin film covering said member 2 may be chosen as desired. However, if the tape 6 is wound at an angle of approximately 45° with respect to the axis A–A of the cylindrical member 2, then there will be obtained a bag having substantially the same longitudinal and transverse mechanical strength in which the tapes intersect each other at an angle of about 90°.

Figure 6:
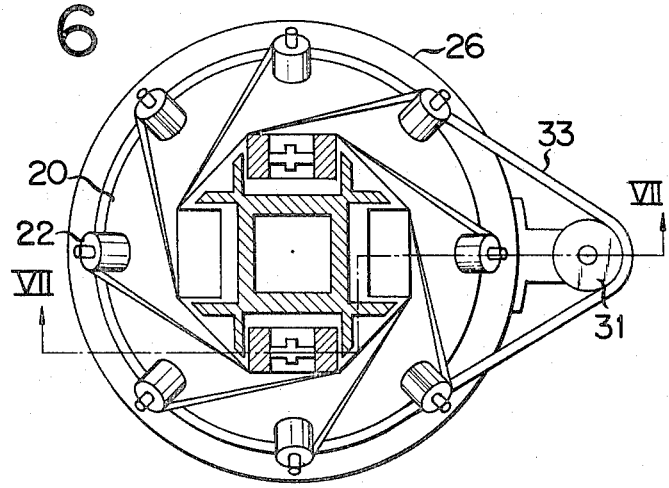
FIG. 6 is a cross section on line VI–VI of FIG. 5.

There will now be described by reference to FIGS. 5 to 15 another method for manufacturing a heavy duty bag according to the present invention. Throughout FIGS. 5 to 8, numeral 17 denotes an endless belt. As illustrated, there are provided four endless belts. These endless belts are arranged on an inner frame 18 in such a manner that their outer strips are equally spaced from each other in a peripheral direction and that if said outer strips are further extended in a peripheral direction they will assume a substantially cylindrical form having an octagonal cross section as shown in FIG. 6. The outer strips of the belts 17 are made to travel upward (as indicated by the arrow) at the same speed along the axis B–B of the cylindrical form as referred to above. Numerals 20 and 19 represent upper and lower holding means, which rotatably support one or more (eight as shown) bobbins 21 and 22 (these numerals denote upper and lower groups of bobbins) about each of which there are respectively wound upper and lower groups 23 and 24 of adhesive stretched tapes made of synthetic resin. The upper and lower holding means 20 and 19 are allowed to rotate in opposite directions at the same speed on upper and lower annular rails 28 and 27 fixed on upper and lower outer frames 26 and 25 respectively by a drive mechanism consisting of a prime mover 29, upper and lower pulleys 31 and 30, upper and lower belts 33 and 32 and gear 34.

The lower group 23 of adhesive stretched tapes made of synthetic resin is wound about the aforesaid octagonal form defined by the outer strips of the endless belts 17. While the endless belts 17 are being operated, the lower tape holding means 19 is allowed to rotate around the octagonal cylindrical form. Then said tapes 23 are spirally wound to form an octagonal cylindrical body. On the other hand, the upper tape holding means 20 is made to rotate in the opposite direction to the lower holding means 19. Then the upper group 24 of stretched tapes is spirally wound in the opposite direction to the lower tapes 23 on the outside thereof in a manner to intersect them, similarly forming an octagonal cylindrical body. Bonding of the superposed portions of the intersecting tapes 23 and 24 allows an octagonal cylindrical network 35 to be continuously drawn out at the upper ends of the endless belts 17. Said network is pressed between the press rolls 36 to ensure bonding, drawn out in a flattened cylindrical body 37 and cut to a suitable length. When the cut portion of the network is sealed at one end there is obtained a desired heavy duty bag. Further, if required, there are provided one or more groups of supplementary rolls 38 to prevent the meshes of the octagonal cylindrical network 35 from being deformed when it is flattened.

Figure 7:
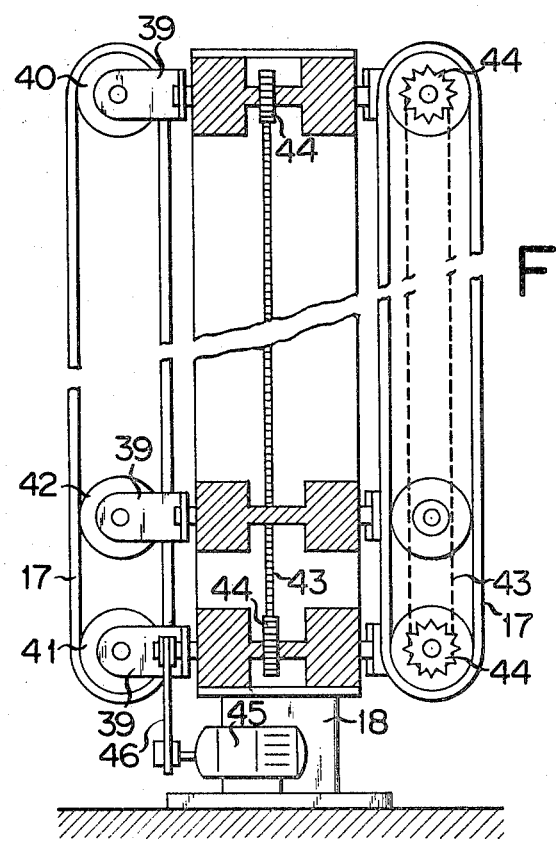
FIG. 7 is a cross section on line VII–VII of FIG. 6.

FIG. 7 is a cross section on line VII–VII of FIG. 6, presenting in detail that part of a bag manufacturing apparatus used in the present invention shown in FIG. 5 which is associated with the endless belts 17. On the outside of the inner frame 18 set up on a bed are fitted a plurality of brackets 39. There are provided a plurality of rolls 40, 41 and 42 whose axles are supported by the brackets 39, and there is stretched each endless belt 17 over said rolls 40, 41 and 42. The uppermost and lowermost rolls 40 and 41 are driven by a prime mover 45 and transmission mechanism 46 interlockingly with a chain 43 and chain wheel 44 so as to allow the outer strip of each endless belt 17 to travel upward. The remaining roll 42 is used as a free guide roll and there are provided a required number thereof to prevent the warp of the endless belt 17. The respective endless belts 17 are so adjusted as to travel at an equal speed. The endless belt 17 may consist of any material if it is mechanically strong and not subject to warping, for example, a thin stainless steel plate, fabric, cord-incorporated rubbers used singly or in combination. Where the tape is thermally bonded, it should withstand said bonding temperature.

Figure 8:
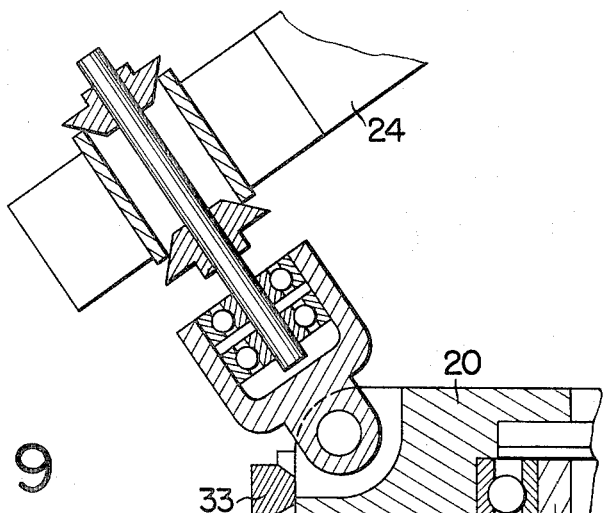
FIG. 8 is an enlarged cross section of the C portion of FIG. 5.

FIG. 8 is an enlarged section of the C portion of FIG. 5 for better understanding of the tape holding means and bobbin assembly. The same parts of FIG. 8 as those of FIGS. 5 to 7 are denoted by the same numerals.

The foregoing relates to the case where there are combined four endless belts to assume a cylindrical form having an octagonal cross section. The cross section is preferred to approximate a circular form as much as possible, so that it is desired to combine a larger number of endless belts. Since, however, such arrangement leads to the complicated construction of a bag manufacturing apparatus, it is only recommended where it is intended to manufacture a heavy duty bag of relatively large diameter.

Tape bonding may be made by directly heat sealing tapes using the press rolls 36 as heat rolls or by another process which consists in coating the outer surface of the tape 23 constituting the inner portion of a cylindrical network and/or the inner surface of the tape 24 forming the outer portion of the cylindrical network with a thermosetting solution-type adhesive having a long pot life, followed by drying, or previously taking up on a bobbin a tape coated with a hotmelt adhesive and then cooled, pressing the tape between the press rolls 36 used as heat rolls and, if required, later subjecting it to further cooling using separate cooling rolls. It will be apparent that with respect to tape bonding, there may also be adopted a mechanism which continuously applies an adhesive on the superposed portions of intersecting tapes just before they are introduced into the manufacturing apparatus.

Figure 9:
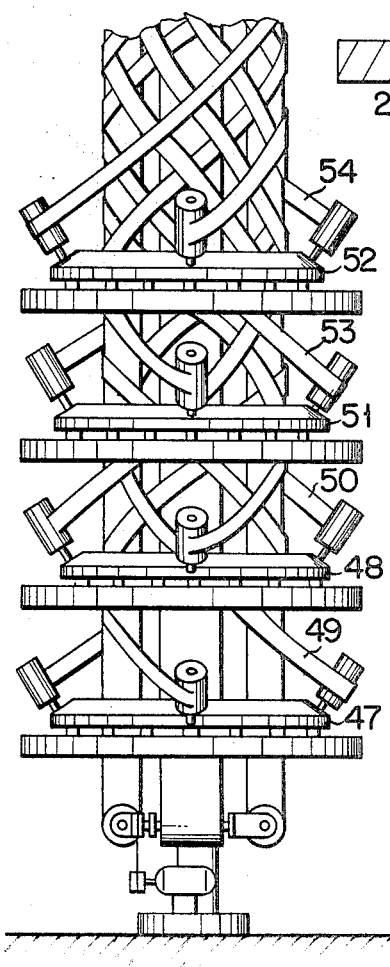
FIG. 9 is an elevation of part of still another apparatus used in the invention.

The angle defined by the tapes 23 and 24 constituting the cylindrical network 37 with the axis B-B of said network and the angle at which said tapes 23 and 24 intersect each other may be freely determined by varying the interrelationship between the travelling speed of the endless belts 17 and the rotating speed of the tape holding means 19 and 20. However, if the tapes 23 and 24 are so wound as to define an angle of about 45° with the aforesaid axis B-B, it will be most preferable, because there is obtained a bag having a great mechanical strength in which said tapes 23 and 24 intersect each other at an angle of about 90°. The number of bobbins fitted to the tape holding means 19 and 20 is suitably determined according to the angle defined by the tapes with the axis B-B, their width and interspace FIG. 9 represents the case where there are used long endless belts and four tape holding means. Namely, the interspace between the tapes 49 and 50 supplied from the lower two tape holding means 47 and 48 is filled with the tapes 53 and 54 introduced from the upper two holding means 51 and 52. Such a device produces a stronger heavy duty bag in which the cylindrical network is formed of apparently entwined tapes.

Figure 10:
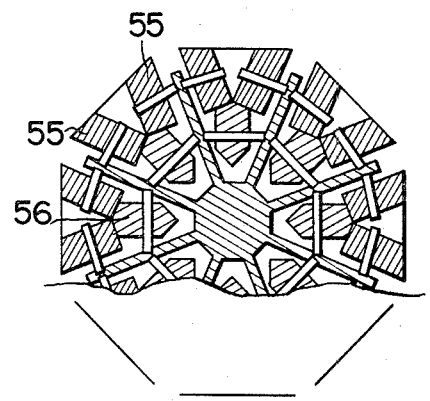
FIG. 10 is a cross section of that part of a further apparatus used in the invention which corresponds to FIG. 6.
Figure 11:
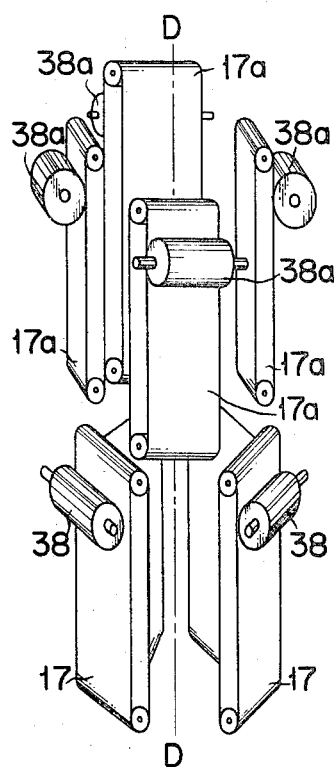
FIG. 11 is a perspective view of the main part of a still further apparatus used in the invention.
Figure 12:
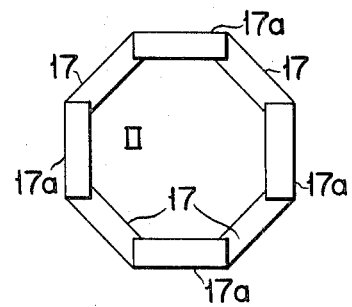
FIG. 12 is a plan view of the apparatus of FIG. 11, showing the arrangement of endless belts.

For uniform and firm bonding of tapes, it is preferred that of the periphery of a cylindrical form defined by endless belts having a polygonal cross section, that part occupied by the belt be as broad as possible. Such arrangement can be realized by using soft belt material and special-shaped guide rolls 55 and 56 having a cross section as shown in FIG. 10. Also in this case, however, the bag manufacturing apparatus will unavoidably become relatively complicated in design. For easy resolution of this problem, there is recommended a device jointly indicated by FIGS. 11 and 12. As apparent from FIG. 11, there are used upper and lower groups 17a and 17 of endless belts to provide a cylindrical form. Namely, the endless belts are arranged in such a manner that as in the direction of the axis D-D of said cylindrical form, the outer surfaces on both sides of the respective endless belts make up for each other. Further, the upper and lower endless belts are provided with supplementary rolls 38a and 38 respectively. Such a device ensures the firm bonding of all the superposed parts of intersecting tapes, because they never fail to be tightly pressed together before they leave the bag manufacturing apparatus from above the upper endless belts 17a.

If the material to be contained in a bag has the form of fine powders or is of such type to which the intrusion of moisture or dust is objectionable, then it is desired that when a network consisting of synthetic resin stretched tapes is used in manufacturing a heavy duty bag, one or both sides of said network be coated with a film as described above. To this end, it is possible to extrude a film from, for example, a T die and laminate it with a network prepared from only the stretched tapes wound by the aforementioned process. However, if a film is bonded with the network at the same time the latter is prepared, then the manufacturing efficiency will be further increased.

FIGS. 13 to 15 indicate the processes to meet the above-mentioned object. Referring to FIG. 13, numeral 57 denotes a film holding means. A broad flat film 58 is spirally wound about the cylindrical form defined by a plurality of endless belts by means of a prime mover 59 and transmission means 60 at a certain speed interlocking with the travelling speed of the endless belts 17, in such a manner that there is not left any gap between the adjacent edges of the wound film (if required, the film edges are allowed to be superposed on each other). Thereafter stretched tapes are spirally wound on said film in the same manner as shown in FIGS. 5 to 12 to form a heavy duty bag consisting of a combination of a cylindrical network and film.

According to the processes of FIGS. 14 and 15, one or two broad films 62 and 63 are guided to the bottom end of endless belts 17 by means of rolls 64 and 65 and rolled by a guide means 61 in a manner to wrap the cylindrical form defined by a plurality of endless belts 17. Both ends of a single rolled film (FIG. 14) are bonded together and the adjacent ends of two rolled films (FIG. 15) are similarly bonded. Under such conditions, the single or double film is allowed to travel upward over the surface of said cylindrical form to provide a cylindrical body of film. In this case, the film edges may overlap each other, if required. Thereafter tapes are wound about the cylindrical film body thus prepared to obtain a network-film composite body as described above. If the surface of said composite body is further coated with another film, there is obtained a heavy duty bag in which the network is sandwiched between two films.

If a heavy duty bag according to the present invention consists of stretched tapes of synthetic resin combined with yarns or fibers hydrophilic tapes, stretched tapes made of low softening thermoplastic synthetic resin, or, foamed stretched tapes prepared from thermoplastic synthetic resin etc., (or the first mentioned synthetic resin stretched tapes may be replaced partly or wholly by the above-listed other materials depending on their kinds), then there will be obtained a heavy duty bag having various excellent properties. It will be apparent that as in the aforementioned case, there may be bonded a synthetic resin film to said network formed of tapes to provide a heavy duty bag consisting of a network-film composite body.

There will now be described a combined use of the main synthetic resin stretched tapes and other materials as listed above. FIG. 16 is a perspective view of a heavy duty bag consisting of said stretched tapes, to one or both sides of which are bonded strong yarns. FIG. 17 is an enlarged cross section of the bag of FIG. 16. The bag of FIG. 16 is prepared by bonding yarns 66 to one side of a synthetic resin stretched tape 67, spirally winding said tape 67 in a manner to allow its edges to slightly overlap each other to form an inner cylindrical body, spirally winding in the opposite direction another piece of synthetic resin stretched tape 67 to one side of which there are bonded said yarns 66 so as to form an outer cylindrical body, bonding together those planes of the tapes to which there are not attached said yarns 66 to form a cylindrical network and sealing one end of said network to provide a bottom 68. The yarns are used in reinforcement and their materials may be suitably selected from among natural yarns such as those formed of cotton and hemp, and synthetic fibers such as those of polyamide, polyvinyl alcohol and polypropylene systems. Yarns for reinforcement may be bonded to stretched tapes in advance or when said tapes are made into a cylindrical body.

FIGS. 18 to 20 are enlarged fractional cross sections of the materials used in preparing other types of yarn-reinforced heavy duty bag. Throughout these FIGS. numeral 66 denotes yarns and numeral 67 stretched tapes. FIG. 18 presents an arrangement in which there are used yarns to the outer surface of an assembly of superposed cylindrical bodies prepared from stretched tapes and in the interspace between said superposed cylindrical bodies, FIG. 19 indicates an arrangement in which there are interposed yarns between said superposed cylindrical bodies and FIG. 20 shows an arrangement in which there are disposed yarns on the outer and inner surfaces of said assembly of superposed cylindrical bodies of stretched tapes and in the interspace therebetween. Where a heavy duty bag is demanded to have a surface resistant to slipping, particularly preferable is the one prepared from said assembly, to the outer or outer and inner surfaces of which there are attached yarns.

FIGS. 21 and 22 are elevations, with part broken away, of heavy duty bags prepared from synthetic resin stretched tapes used as a base and hydrophilic tapes incorporated in their interspaces. The bag of FIG. 21 comprises a base tape consisting of a synthetic resin stretched tape 69 and a hydrophilic tape 70 prepared from paper, cellophane, polyvinyl alcohol, etc. These two different types of tape 69 and 70 are spirally wound in alternate arrangement to form an inner cylindrical body 71, and on said body there are again similarly spirally wound said tapes 69 and 70 to form an outer cylindrical body 72. Both bodies are bonded together and one end of the bonded assembly is sealed to form a bottom 73. It will be apparent that the two tapes constituting the cylindrical body 72 are spirally wound in the opposite direction to those of the cylindrical body 71. Since it consists of a hydrophilic tape jointly used with a synthetic resin stretched tape, the aforesaid heavy duty bag has an excellent moisture-absorbing and dehumidifying property, a favourable feature as a bag for handling agricultural products such as rice and wheat, and moreover retains a desirable mechanical strength due to the use of said stretched tape as a base material.

The heavy duty bag of FIG. 22 is formed of the same kinds of tape as those of FIG. 21, the only difference being that there is used one hydrophilic tape 70 for three juxtaposed stretched tapes 69.

With respect to the heavy duty bags of FIGS. 21 and 22, polyolefinic resins such as high density polyethylene and polypropylene are most preferred as the material of a stretched tape 69. At the present moment, however, there is not available any good hydrophilic adhesive for such polyolefinic resins. If, therefore, the hydrophilic tape 70 to be jointly used with said stretched tape is coated with an adhesive originally intended for use with polyolefinic resins, then the hydrophilic tape 70 will be reduced in its moisture-absorbing property. Accoring, where the hydrophilic tape 70 is used in small proportions relative to the stretched tape 69 there is no need to coat the hydrophilic tape 70 with any adhesive. Again where large proportions of the hydrophilic tape 70 are used with the stretched tape 69, the hydrophilic tape 70 is preferably coated with a thermally operable adhesive in the form of lines or dots, and a heavy duty bag is prepared by thermally melting said adhesive after a cylindrical body is formed of said two types of tapes. Then the resultant bag will be saved from a decrease in its moisture-absorbing and dehumidifying property. Further, there may be interposed a low density polyethylene film between the outer and inner cylindrical bodies according to the application in which it is desired to use a heavy duty bag.

If, a synthetic resin stretched tape is jointly used with another tape prepared from low density polyethylene, then the resultant bag will increase in pliability. Moreover, since the low density polyethylene tape has a low softening point, its surface easily melts at the time of thermal bonding, thereby increasing the bonded strength. Also when the stretched tape is jointly used with foamed tape such as foamed high density polyethylene or polypropylene, there will be obtained a soft bag. In addition, such bag will display a special latticed appearance due to the opaqueness of said foamed tape Further, if there is incorporated a foamed tape containing continuous cells obtained by proper adjustment of a foaming operation, then there will be produced a bag having good breathability. If the jointly used two tapes are made of the same material bearing different colors, the resultant bag will display a unique interesting appearance. As mentioned above, suitable selection of jointly used tapes will enable a heavy duty bag to be manufactured in a large variety of form with different properties or interesting visual appeals.

FIGS. 23 and 24 present a heavy duty bag in which at least one of the outer and inner cylindrical bodies is only prepared from a stretched tape consisting of foamed synthetic resin. This bag is manufactured by spirally winding a stretched tape 74 consisting of foamed thermoplastic synthetic resin such as foamed polyethylene or foamed polypropylene to provide inner and outer cylindrical bodies 75 and 76, bonding both bodies and sealing one end of the bonded assembly to form a bottom 77. In this case, the foamed tape constituting either the inner 75 or outer 76 body is spirally wound in the opposite direction to the tape forming the other body.

In the case where there is used such a foamed tape, excess foaming would decrease the mechanical strength of the tape to deteriorate the properties demanded of a heavy duty bag. Therefore, it is advisable to prepare one of the inner and outer cylindrical bodies from said foamed tape and the other from a nonfoamed tape, so as to maintain the strength of a heavy duty bag as a whole.

A bag comprising such foamed tape offers a soft touch, and presents an improved visual appeal, because it is reduced in transparency and delustered. Moreover, said bag is more resistant to slipping due to its irregular surface.

FIGS. 25 and 26 illustrate a heavy duty bag prepared from a double-layer stretched tape, one side of which is composed of a high crystallinity thermoplastic synthetic resin and the other side of which consists of another type of thermoplastic resin having a lower softening point than the former resin. In this case, the high crystallinity thermoplastic resin includes high density polyethylene, polypropylene and polyamide resins, and the low softening thermoplastic resin consists of low density polyethylene, ethylene-vinyl acetate copolymer or ethylene-propylene copolymer. To prevent the molecular orientation of the high crystallinity resin layer from being disturbed when the inner and outer cylindrical bodies are bonded together, it is required that the softening point of said low softening resin be 20° or over lower than that of the jointly used high crystallinity resin. If the double layer tapes are so arranged as to allow the mutually facing layers of low softening resin to be bonded together, the material of said resin may be freely chosen. Such double-layer stretched tape may be prepared by suitably selecting any of the various means, for example, of simultaneously processing high crystallinity resin and low softening resin jointly into a double layer film followed by stretching, coating low softening resin on a single layer of high crystallinity resin to form a double-layer film, followed by stretching, or first stretching a single layer film of high crystallinity resin and then coating low softening resin thereon. Namely, the heavy duty bag of FIGS. 25 and 26 is formed by spirally winding a double-layer stretched tape. One side of which consists of high crystallinity thermoplastic synthetic resin 78 and the other side of which is made of another thermoplastic resin 79 having a lower softening point than the former resin, so as to form inner and outer cylindrical bodies 80 and 81, thermally bonding together said bodies, and sealing one end of this bonded assembly to provide a bottom 82. The double-layer tapes constituting the inner and outer cylindrical bodies 80 and 81 are spirally wound in opposite directions in such a manner as to allow the low softening resin layers 79 to face each other by being disposed on the outside of the inner cylindrical body and the inner side of the outer cylindrical body.

With a heavy duty bag made of double-layer tapes, the inner and outer cylindrical bodies can be firmly bonded with heat without using an adhesive, thus simplifying the manufacturing process. Further, said bag has a fully great mechanical strength due to the incorporation of high melting high crystallinity thermoplastic resin, while it is made pliant by the use of low softening thermoplastic resin such as low density polyethylene.

The group of FIGS. 27 to 29 and that of FIGS. 30A and 30B to 32 represent modifications of a bag prepared from a combination of a cylindrical network and film. Referring to FIGS. 27 to 29, the bag is prepared by spirally bonding a synthetic resin stretched tape 83 to a cylindrical body 84 of synthetic resin film at an angle of 45° with respect to the axis of said cylindrical body, turning over the lower half of the bonded mass starting approximately with the middle point 85 thereof and superposing said half on the upper half and sealing one end of the superposed assembly to provide a bottom 86. Further, it is possible to allow the stretched tape 83 to be exposed to the outside of the bag in an opposite manner to the illustrated case when the aforesaid turnover is made. Such bag is well adapted for use in an application in which it is demanded to display resistance to slipping.

Referring to FIGS. 30A and 30B to 32, a heavy duty bag is prepared by spirally winding synthetic resin tapes 87 about two cylindrical forms 88 and 89 of synthetic resin film having slightly different diameters in opposite directions as illustrated in FIGS. 30A and 30B and at an angle of substantially 45° with respect to the axis of the cylindrical form, bonding the tape to the film, superposing two cylindrical forms 88 and 89 as shown in FIG. 31 and sealing one end of the superposed assembly to provide a bottom 90.

In either of the cases represented by the group of FIGS. 27 to 29 and that of FIGS. 30A and 30B to 32, the handling of a bag is made easier if its upper edge portion is made into a single integrated layer of joining the inner and outer cylindrical bodies, for example, by bonding.

We claim:

1. A heavy duty bag comprising a plurality of superposed cylindrical bodies of spirally wound stretched tapes of synthetic resin, the superposed bodies being wound in opposite directions in a manner such that the tapes intersect each other, the superposed portions of said intersecting tapes being bonded together to form a cylindrical network and one end thereof being sealed to provide a bottom.

2. The heavy duty bag according to claim 1 comprising a synthetic resin film bonded to at least one of the areas represented by an interspace between the inner and outer cylindrical bodies, and the inner and outer surfaces of the cylindrical network.

3. The heavy duty bag according to claim 1 comprising a yarn bonded to at least one side of the synthetic resin stretched tape.

4. The heavy duty bag according to claim 2 comprising a yarn bonded to at least one side of the synthetic resin stretched tape.

5. The heavy duty bag according to claim 1 wherein the bag includes a first spirally wound synthetic resin stretched tape, and a different kind of tape, similarly spirally wound, the different kind of tape being incorporated in the interspaces between the first mentioned windings, thereby forming a heavy duty bag.

6. The heavy duty bag according to claim 2 wherein the bag includes a first spirally wound synthetic resin stretched tape, and a different kind of tape, similarly spirally wound, the different kind of tape being incorporated in the interspaces between the first mentioned windings, thereby forming a heavy duty bag.

7. The heavy duty bag according to claim 1 wherein at least one of the cylindrical bodies is comprised of a foamed stretched tape.

8. The heavy duty bag according to claim 2 wherein at least one of the cylindrical bodies is comprised of a foamed stretched tape.

9. The heavy duty bag according to claim 1 wherein a cylindrical body is comprised of a double-layer stretched tape, one side of which includes a high crystallinity thermoplastic resin and the other side of which includes another thermoplastic resin having a softening point 20° C. or more lower than the former resin, the layers of said low softening resin facing each other.

10. The heavy duty bag according to claim 2 wherein a cylindrical body is comprised of a double-layer stretched tape, one side of which includes a high crystallinity thermoplastic resin and the other side of which includes another thermoplastic resin having a softening point 20° C. or more lower than the former resin, the layers of said low softening resin facing each other.

11. The heavy duty bag according to claim 1 wherein the synthetic resin stretched tape is comprised of one material selected from the group consisting of high density polyethylene and polypropylene.

12. The heavy duty bag according to claim 2 wherein the synthetic resin film is comprised of one material selected from the group consisting of polyethylene, polypropylene, and polyvinyl chloride.

13. The heavy duty bag according to claim 3 wherein the yarn is comprised of one material selected from the group consisting of cotton, hemp, and synthetic fibers of polyamide, polyvinyl alcohol and polypropylene systems.

14. The heavy duty bag according to claim 5 wherein the different kind of tape jointly used with the synthetic resin stretched tape is a hydrophilic type comprised of one material selected from the group consisting of paper, cellophane and polyvinyl alcohol.

15. The heavy duty bag according to claim 5 wherein the different kind of tape jointly used with the synthetic resin stretched tape is made of low density polyethylene.

16. The heavy duty bag according to claim 5 wherein the different kind of tape jointly used with the synthetic resin stretched tape is a foamed type and is comprised of one material selected from the group consisting of high density polyethylene and polypropylene.

17. The heavy duty bag according to claim 7 wherein the foamed stretched tape is made of one material selected from the group consisting of polyethylene and polypropylene.

18. The heavy duty bag according to claim 9 wherein the high crystallinity thermoplastic resin if formed of one material selected from the group consisting of high density polyethylene, polypropylene and polyamide.

19. The heavy duty bag according to claim 9 wherein the low softening point thermoplastic synthetic resin is made of one material selected from the group consisting of low density polyethylene, ethylene-vinyl acetate copolymer and ethylene-propylene copolymer.